(12) United States Patent
Kanade et al.

(10) Patent No.: US 8,333,494 B2
(45) Date of Patent: Dec. 18, 2012

(54) MULTICOLORED LINEAR LIGHT SOURCE

(75) Inventors: Udayan Kanade, Pune (IN); Gaurav Kulkarni, Pune (IN); Karthikk Sridharan, Hillsboro, OK (US); Manas Alekar, Lake Forest, CA (US); Manohar Joshi, Los Angeles, CA (US); Sanat Ganu, Pune (IN); Balaji Ganapathy, Atlanta, GA (US)

(73) Assignee: I2iC Corporation, Foster City, IA (US)

( * ) Notice: Subject to any disclaimer, the term of this patent is extended or adjusted under 35 U.S.C. 154(b) by 0 days.

(21) Appl. No.: 12/667,526

(22) PCT Filed: Jul. 5, 2008

(86) PCT No.: PCT/IB2008/052704
§ 371 (c)(1),
(2), (4) Date: Jul. 9, 2010

(87) PCT Pub. No.: WO2009/004597
PCT Pub. Date: Jan. 8, 2009

(65) Prior Publication Data
US 2010/0283376 A1    Nov. 11, 2010

(30) Foreign Application Priority Data
Jul. 5, 2007  (IN) .................. 1284/MUM/2007

(51) Int. Cl.
*F21V 9/00*    (2006.01)
(52) U.S. Cl. .......... 362/511; 362/606; 362/26; 362/616; 362/558; 257/98

(58) Field of Classification Search .......... 313/567–647; 362/606, 610, 615–616, 618, 627, 511, 26, 362/622, 558, 582, 510, 545, 217.08, 217.09, 362/260, 293, 355; 257/89, 98
See application file for complete search history.

(56) References Cited

U.S. PATENT DOCUMENTS

| | | | | |
|---|---|---|---|---|
| 4,924,357 | A * | 5/1990 | Yamashita et al. | 362/582 |
| 6,139,174 | A * | 10/2000 | Butterworth | 362/555 |
| 6,295,106 | B1 * | 9/2001 | Fukuzawa et al. | 349/71 |
| 6,454,451 | B1 * | 9/2002 | Vollkommer et al. | 362/559 |
| 7,494,259 | B2 * | 2/2009 | Hayashi et al. | 362/609 |
| 7,667,788 | B2 * | 2/2010 | Lee et al. | 349/65 |
| 7,695,150 | B2 * | 4/2010 | Dejima et al. | 362/84 |
| 7,891,852 | B2 * | 2/2011 | Pugh et al. | 362/606 |
| 8,118,470 | B2 * | 2/2012 | Niu | 362/624 |

(Continued)

FOREIGN PATENT DOCUMENTS
JP          4094054 A    3/1992
(Continued)

OTHER PUBLICATIONS
machine translation Shiozaki JP 2005190848 A.*
(Continued)

*Primary Examiner* — Anne Hines
*Assistant Examiner* — Jose M Diaz

(57) ABSTRACT

A multicolored linear light source is disclosed. In an embodiment the multicolored linear light source (100) comprises a linear light source (100) emanating light of a first spectrum, and regions of photoluminescent material (102,104,106). The light of the first spectrum interacts with regions of photoluminescent material (102,104,106) to give light of a different spectrum. The composition of different regions of photoluminescent material is different, providing light of different spectra in different regions.

4 Claims, 3 Drawing Sheets

U.S. PATENT DOCUMENTS

| | | | |
|---|---|---|---|
| 2001/0001207 A1* | 5/2001 | Shimizu et al. | 257/98 |
| 2003/0095399 A1* | 5/2003 | Grenda et al. | 362/30 |
| 2006/0120110 A1* | 6/2006 | Lin et al. | 362/615 |
| 2007/0025098 A1* | 2/2007 | Kim et al. | 362/97 |
| 2008/0002430 A1* | 1/2008 | Kanade et al. | 362/613 |
| 2008/0310169 A1* | 12/2008 | Chen et al. | 362/311 |
| 2009/0091945 A1* | 4/2009 | Joseph | 362/555 |
| 2010/0220261 A1* | 9/2010 | Mizushima et al. | 349/64 |

FOREIGN PATENT DOCUMENTS

| | | | |
|---|---|---|---|
| JP | 2001/015082 A | | 1/2001 |
| JP | 2001015082 A | * | 1/2001 |
| JP | 2002/117810 A | | 4/2002 |
| JP | 2004/169362 A | | 6/2004 |
| JP | 2005/190848 A | | 7/2005 |
| JP | 2005190848 A | * | 7/2005 |
| WO | WO 2004/001705 A1 | | 12/2003 |
| WO | 2008/052195 | | 11/2008 |

OTHER PUBLICATIONS machine translation Tamura JP 2001015082 A.*

* cited by examiner

MULTICOLORED LINEAR LIGHT SOURCE

This patent claims priority from provisional patent number 1284/MUM/2007 titled "Multicolored Linear Light Source" filed on 5 Jul. 2007 in Mumbai, India.

TECHNICAL FIELD

The present invention relates to a source of illumination. Particularly, the invention relates to an apparatus and method for a source of illumination producing multiple colors.

BACKGROUND ART

A source of illumination is used for lighting purposes. A linear light source may be used as a source of illumination to provide light in the backlights of display systems. In color transmissive display systems such as liquid crystal displays, the backlights are designed to provide light into the liquid crystal sheet. The light emanating from the liquid crystal sheet passes through a sheet of color filters. The color filter sheet allows only light of a particular color to pass through and blocks light of other colors. So, a significant proportion of light emanating from the backlight is blocked by the color filter sheet, reducing the efficiency of the display.

There exists prior art wherein a color display is lighted by column sources of light, each column carrying light of a particular color. A multicolored light source is needed so that light of various colors is coupled into the various columns. The multicolored linear light sources known in art are cumbersome and costly to produce. Thus, there is a need for a simple and cheaper multicolored linear light source.

A photoluminescent tube (usually known as a fluorescent tube) is used as a source of illumination for backlights in displays. A photoluminescent tube is made of a gas discharge tube coated with photoluminescent material on the surface of the tube. When a high voltage is applied across the tube, ionization of the gases occurs. These ions emit photons which hit the photoluminescent materials on the surface. The photoluminescent materials on the surface emit light of a particular spectrum. Photoluminescent material is any material which absorbs photons and hence emits photons. Photoluminescent materials include fluorescent materials, phosphorescent materials and scintillators.

DISCLOSURE OF INVENTION

Summary

A multicolored linear light source is disclosed. In an embodiment, the multicolored linear light source comprises a linear light source emanating light of a first spectrum, and regions of photoluminescent material. The light of the first spectrum interacts with regions of photoluminescent material to give light of a different spectrum. The composition of different regions of photoluminescent material is different, providing light of different spectra in different regions.

The above and preferred features, including various details of implementation and combination of elements are more particularly described with reference to the accompanying drawings and pointed out in the claims. It will be understood that the particular methods and systems described herein are shown by way of illustration only and not as limitations. As will be understood by those skilled in the art, the principle embodiments without departing from the scope of the invention.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles of the present invention.

DETAILED DESCRIPTION

A multicolored linear light source is disclosed. In an embodiment, the multicolored linear light source comprises a linear light source emanating light of a first spectrum, and regions of photoluminescent material. The light of the first spectrum interacts with regions of photoluminescent material to give light of a different spectrum. The composition of different regions of photoluminescent material is different, providing light of different spectra in different regions.

Figure 1:
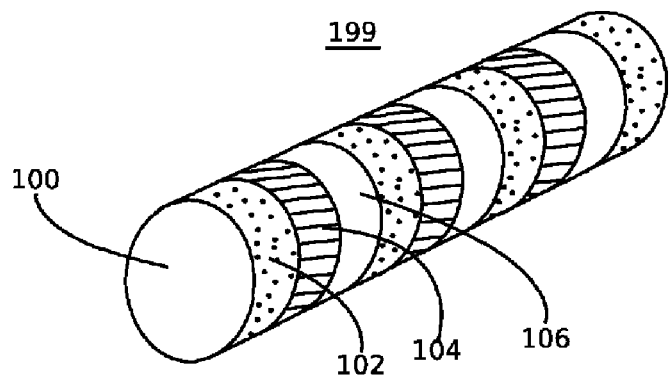
FIG. 1 illustrates a block diagram of a multicolored linear light source, according to an embodiment.

FIG. 1 illustrates a block diagram of a multicolored linear light source 199, according to an embodiment. The inner surface of a gas discharge tube 100 is coated with different photoluminescent materials as shown in the figure to give a multi-colored photoluminescent tube. The photoluminescent materials 102, 104, 106 are such that, light emanating from them are of different spectra. In an embodiment, the gas discharge tube is a cold cathode lamp. In another embodiment, the gas discharge tube is a hot cathode lamp.

Figure 2:
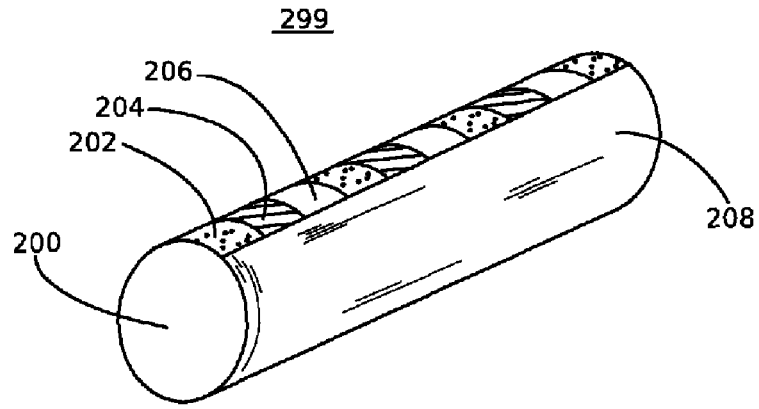
FIG. 2 illustrates a block diagram of a multicolored linear light source comprising a mirror, according to an embodiment.

FIG. 2 illustrates a block diagram of a multicolored linear light source 299 comprising a mirror, according to an embodiment. The outer surface of the photoluminescent tube 200 is partially covered by a mirror 208. In a region where the mirror is not present, photoluminescent material 202, 204 and 206 are provided. Light produced by low pressure gas in the photoluminescent tube falling on the mirror 208 gets reflected once or more times, till it falls on one of the photoluminescent materials 202, 204 or 206. Light falling on the photoluminescent materials 202, 204 and 206 causes light emanation. The photoluminescent materials 202, 204, 206 are such that, light emanating from them are of different spectra.

Figure 3:
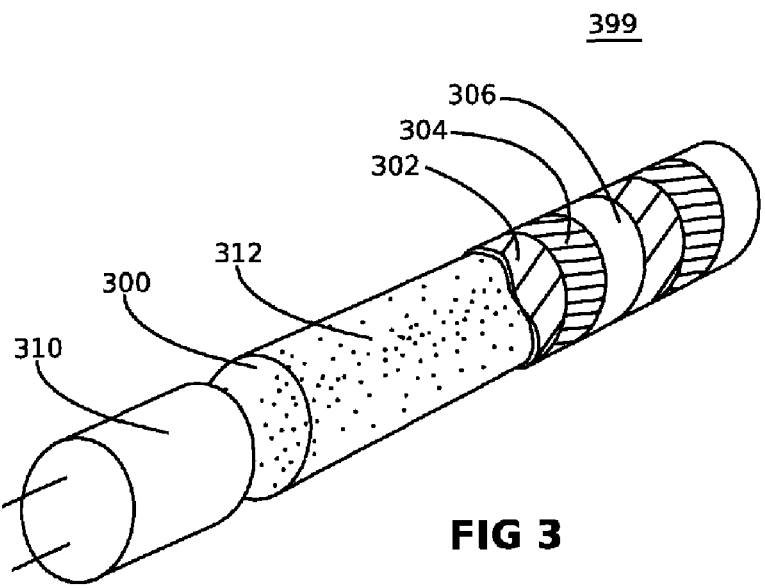
FIG. 3 illustrates a cutaway diagram of a multicolored linear light source comprising a light guide and diffuser, according to an embodiment.

FIG. 3 illustrates a cutaway diagram of a multicolored linear light source 399 comprising a light guide and diffuser, according to an embodiment. Light source 310 emanates light into light guide 300. The light traveling through light guide 300 is scattered by diffuser particles 312 present inside it. The surface of the light guide 300 is coated with different photoluminescent materials 302, 304 and 306. Light scattered by the diffuser particles 312 reaches the photoluminescent materials, causing light emanation from the photoluminescent materials. The photoluminescent materials 302, 304, 306 are such that, light emanating from them are of different spectra.

Figure 4:
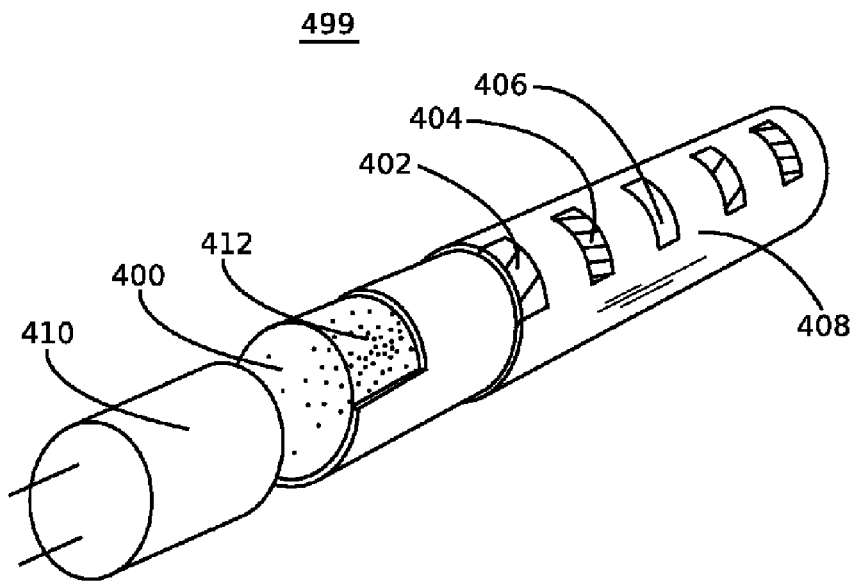
FIG. 4 illustrates a cutaway diagram of a multicolored linear light source comprising a light guide, a diffuser and a mirror, according to an embodiment.

FIG. 4 illustrates a cutaway diagram of a multicolored linear light source 499 comprising a light guide, a diffuser and a mirror, according to an embodiment. Light source 410 emanates light into light guide 400. The light traveling through the light guide 400 is scattered by diffuser particles 412 present inside it. The surface of the light guide 400 is partially covered by a mirror 408. In a region where the mirror is not present, photoluminescent materials 402, 404 and 406 are provided. Light scattered by the diffuser particles 412 falling on the mirror 408 gets reflected once or more times, till it falls on one of the photoluminescent materials 402, 404 or 406. Light falling on the photoluminescent materials 402, 404 and 406 causes light emanation. The photoluminescent materials 402, 404, 406 are such that, light emanating from them are of different spectra.

Figure 5:
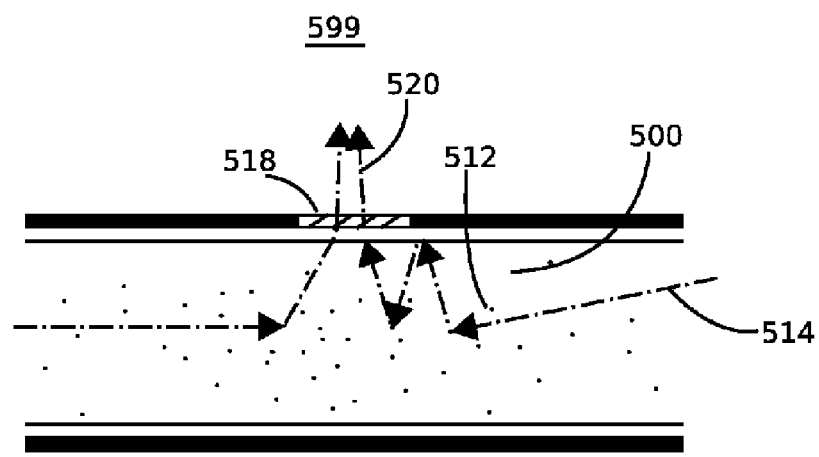
FIG. 5 illustrates a block diagram of extraction of light from a multicolored light source, according to an embodiment.

FIG. 5 illustrates a block diagram of extraction of light from a multicolored light source 599, according to an embodiment. Exemplary, light ray 514 passes through the light guide 500. The light ray 514 undergoes scattering when it impinges on a particle of the diffuser 512. The light ray 514 then gets reflected from the mirror 508 and may again get scattered by diffuser particles. When the light ray 514 falls on the photoluminescent material 518, photoluminescent material 518 emanates light 520 of a particular spectrum.

Figure 6:
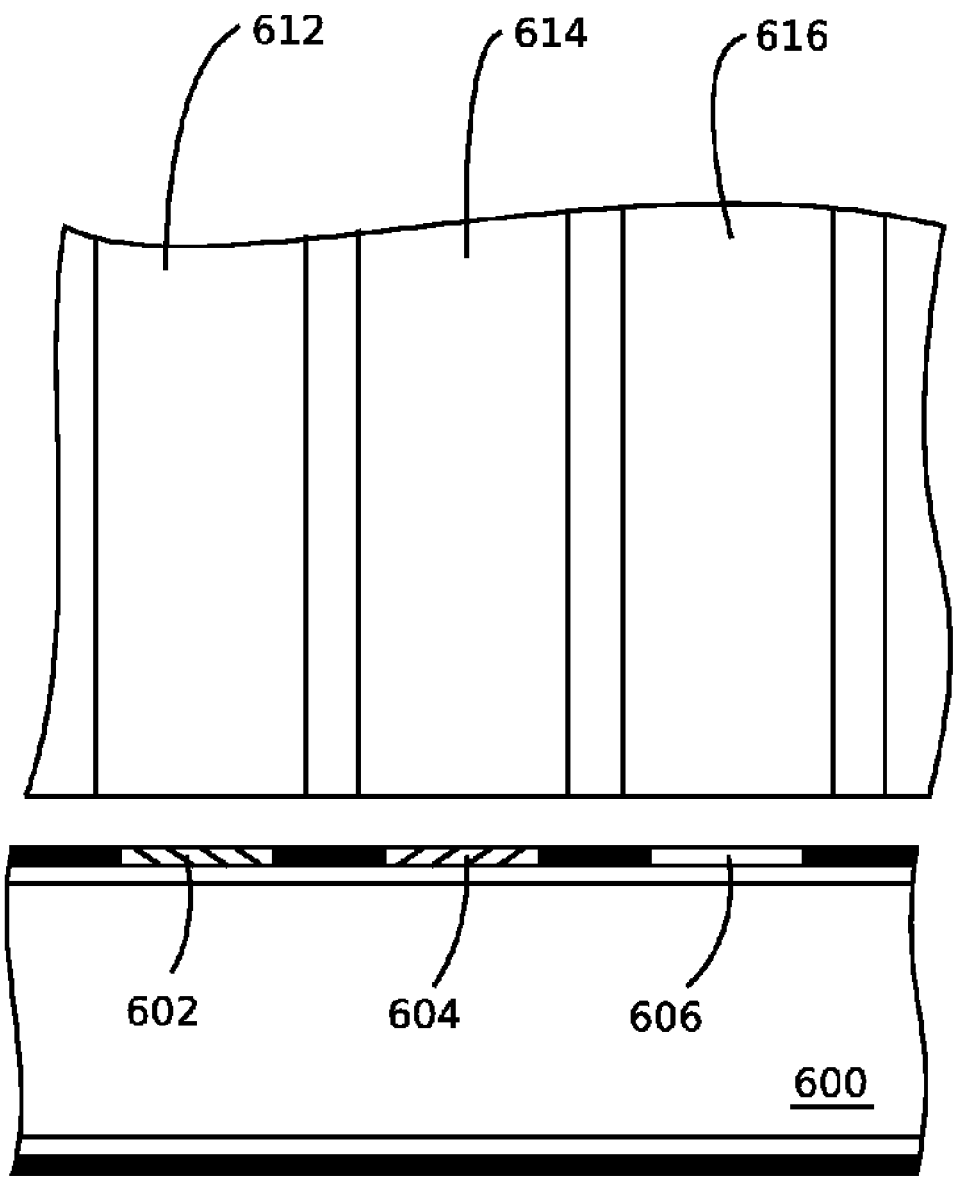
FIG. 6 illustrates a block diagram of a light source comprising column sources of light, according to an embodiment.

FIG. 6 illustrates a block diagram of a light source 699 comprising column sources of light, according to an embodiment. A multicolored linear light source 600 has regions of photoluminescent material 602, 604, 606 on the surface emanating light of different spectra. Coupled to each region of photoluminescent material, is a columnar light guide such as light guides 612, 614 and 616. The light produced by the regions 602, 604 and 606 traverses respective light guides and gets extracted over the entire length of the light guide by light scattering due to small particles, or other extraction methods. The light guides 612, 614 and 616 may have cladding material of lower refractive index between them. They may also have mirrors between them, or behind them.

A multicolored linear light source is disclosed. It is understood that the embodiments described herein are for the purpose of elucidation and should not be considered limiting the subject matter of the present patent. Various modifications, uses, substitutions, recombinations, improvements, methods of production without departing from the scope or spirit of the present invention would be evident to a person skilled in the art.

The invention claimed is:

1. A system comprising
a light source,
a first linear light guide containing light diffuser particles,
a plurality of regions of photoluminescent material disposed on the surface of the first linear light guide, and
a plurality of second light guides situated perpendicular to the plurality of regions of photoluminescent material wherein
light from the light source traveling through the first linear light guide gets scattered by the light diffuser particles and falls on the plurality of regions of photoluminescent material; and
at least a first region of photoluminescent material and a second region of photoluminescent material emanate light of different spectra when light scattered by the light diffuser particles falls on them.

2. A system comprising
a light source,
a first linear light guide containing light diffuser particles,
a plurality of regions of photoluminescent material disposed on the surface of the first linear light guide, and
a mirror partially covering the surface of the first linear light guide, wherein
the plurality of regions of photoluminescent material is disposed in an area where the mirror is not disposed on the surface of the first linear light guide,
light from the light source traveling through the first linear light guide gets scattered by the light diffuser particles and falls on the plurality of regions of photoluminescent material; and
at least a first region of photoluminescent material and a second region of photoluminescent material emanate light of different spectra when light scattered by the light diffuser particles falls on them.

3. The system as disclosed in claim 1, wherein the second light guides further comprise means of extracting light.

4. The system as disclosed in claim 3, wherein the means of extracting light comprise small particles that scatter light.

* * * * *